(12) United States Patent
Gallez et al.

(10) Patent No.: US 10,059,081 B2
(45) Date of Patent: Aug. 28, 2018

(54) FIBERS AND NONWOVEN MATERIALS PREPARED THEREFROM

(75) Inventors: Vincent B. Gallez, Ottignies (BE); William M. Ferry, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 454 days.

(21) Appl. No.: 13/334,854

(22) Filed: Dec. 22, 2011

(65) Prior Publication Data

US 2013/0165008 A1   Jun. 27, 2013

(51) Int. Cl.
| D04H 3/16 | (2006.01) |
| C08L 23/12 | (2006.01) |
| B32B 5/26 | (2006.01) |
| D01F 6/46 | (2006.01) |
| D04H 1/4291 | (2012.01) |
| D04H 3/007 | (2012.01) |
| B32B 5/02 | (2006.01) |

(52) U.S. Cl.
CPC .............. *B32B 5/26* (2013.01); *B32B 5/022* (2013.01); *D01F 6/46* (2013.01); *D04H 1/4291* (2013.01); *D04H 3/007* (2013.01); *Y10T 428/298* (2015.01); *Y10T 442/681* (2015.04)

(58) Field of Classification Search
None
See application file for complete search history.

(56) References Cited

U.S. PATENT DOCUMENTS

| 3,338,992 A | 8/1967 | Kinney |
| 3,341,394 A | 9/1967 | Kinney |
| 3,502,763 A | 3/1970 | Hartmann |
| 3,542,615 A | 11/1970 | Dobo et al. |
| 3,692,618 A | 9/1972 | Dorschner et al. |
| 3,802,817 A | 4/1974 | Matsuki et al. |
| 3,849,241 A | 11/1974 | Butin et al. |
| 4,340,563 A | 7/1982 | Appel et al. |
| 4,379,759 A | 4/1983 | Goeke et al. |
| 4,540,753 A | 9/1985 | Cozewith et al. |
| 5,382,630 A | 1/1995 | Stehling et al. |
| 5,770,753 A | 6/1998 | Kuber et al. |
| 6,248,833 B1 | 6/2001 | Colucci et al. |
| 6,268,203 B1 | 7/2001 | Johnson et al. |
| 6,440,882 B1 | 8/2002 | Colucci et al. |
| 6,525,157 B2 | 2/2003 | Cozewith et al. |
| 6,881,800 B2 | 4/2005 | Friedersdorf |
| 7,232,871 B2 | 6/2007 | Datta et al. |
| 7,601,666 B2 | 10/2009 | Rix et al. |
| 2002/0019507 A1 | 2/2002 | Karandinos et al. |
| 2005/0130544 A1 | 6/2005 | Cheng et al. |
| 2006/0008643 A1* | 1/2006 | Lin et al. ............... 428/364 |
| 2006/0135699 A1* | 6/2006 | Li ........................ C08L 23/10 525/240 |
| 2008/0172840 A1 | 7/2008 | Kacker et al. |
| 2009/0124154 A1* | 5/2009 | Harrington ........... C08L 23/14 442/329 |
| 2009/0149605 A1 | 6/2009 | Li et al. |
| 2009/0311938 A1 | 12/2009 | Campbell et al. |
| 2010/0124864 A1 | 5/2010 | Dharmarajan et al. |
| 2011/0207888 A1 | 8/2011 | Kolb et al. |
| 2011/0253152 A1 | 10/2011 | Lin et al. |
| 2012/0123374 A1 | 5/2012 | Richeson et al. |

FOREIGN PATENT DOCUMENTS

| WO | WO 2004/014998 | 2/2004 |
| WO | WO 2005/111282 | 11/2005 |
| WO | WO 2009/064583 | 5/2009 |
| WO | WO 2010/098792 | 9/2010 |

* cited by examiner

*Primary Examiner* — Shawn Mckinnon
*Assistant Examiner* — Lashawnda T McKinnon

(57) ABSTRACT

The present invention is directed to fibers, nonwoven fabrics, and nonwoven laminates comprising a blend of at least one impact copolymer and at least one propylene-based elastomer. The blends comprise from about 45 to about 85 wt % of an impact copolymer, where the impact copolymer comprises a blend of a propylene homopolymer and a copolymer comprising from about 20 to about 80 wt % propylene-derived units and from about 20 to about 80 wt % ethylene-derived units. The blends further comprise from about 15 to about 55 wt % of a propylene-based elastomer, where the propylene-based elastomer comprises from about 5 to about 25 wt % units derived from one or more $C_2$ or $C_4$-$C_{12}$ alpha-olefins and has a triad tacticity greater than about 90% and a heat of fusion less than about 75 J/g.

18 Claims, No Drawings

FIBERS AND NONWOVEN MATERIALS PREPARED THEREFROM

CROSS REFERENCE TO RELATED APPLICATIONS

This application relates to U.S. Ser. No. 13/310,146, filed Dec. 2, 2011; U.S. Ser. No. 61/411,708, filed Nov. 9, 2010; U.S. Ser. No. 13/015,364, filed Jan. 27, 2011; U.S. Ser. No. 12/271,526, filed Nov. 14, 2008; U.S. Ser. No. 61/101,341, filed Sep. 30, 2008; U.S. Ser. No. 61/157,524, filed Mar. 24, 2009; U.S. Ser. No. 12/566,564, filed Sep. 24, 2009; U.S. Ser. No. 61/156,078, filed Feb. 27, 2009; U.S. Ser. No. 12/566,410, filed Sep. 24, 2009; U.S. Ser. No. 61/171,135, filed Apr. 21, 2009; U.S. Ser. No. 12/566,434, filed Sep. 24, 2009; U.S. Ser. No. 61/248,254, filed Oct. 2, 2009; U.S. Ser. No. 12/894,955, filed Sep. 30, 2010; U.S. Ser. No. 12/723,317, filed Mar. 12, 2010; U.S. Ser. No. 12/723,336, filed Mar. 12, 2010; and U.S. Ser. No. 12/726,642, filed Mar. 18, 2010, each of which are herein incorporated by reference in their entireties.

BACKGROUND OF THE INVENTION

The use of various thermoplastic resins to make fibers and fabrics is well known. In particular, propylene-based polymers and copolymers (sometimes referred to as propylene-based elastomers) are well known in the art for their usefulness in a variety of applications, including the manufacture of nonwoven fabrics. Such fabrics have a wide variety of uses, such as in medical and hygiene products, clothing, filter media, and sorbent products. Nonwoven fabrics are particularly useful in hygiene products, such as baby diapers, adult incontinence products, and feminine hygiene products. An important aspect of these fabrics, particularly in hygiene applications, is the ability to produce aesthetically pleasing fabrics having good leakage performance at low cost.

Propylene impact copolymers are a another type of thermoplastic resin, commonly used in applications where strength and impact resistance is desired such as in molded and extruded automobile parts, household appliances, luggage and furniture. Propylene homopolymers are often unsuitable for such applications because they are too brittle and have low impact resistance particularly at low temperature, whereas propylene impact copolymers are specifically engineered for applications such as these.

Though often used to make films, propylene impact copolymers are not as commonly used to make fibers and fabrics because impact resistance is often not a desired property for such applications. For fibers and fabrics, manufacturers focus on properties such as strength, processability, softness and breathability. U.S. Pat. Nos. 6,440,882 and 6,248,833 and U.S. Patent Application Nos. 2009/0311938 and 2009/0149605 describe fibers and fabrics prepared with impact copolymers.

In many hygiene applications, multilayer nonwoven materials or laminates are employed having at least one elastic core layer and at least one extensible facing layer, where the elastic layer provides the desired conformability and fit of the product (and therefore good leakage performance) while the extensible facing layer provides the desired aesthetics. While propylene-based elastomers are commonly used to form such elastic layers, the facing layers are often composed of bicomponent polymer blends. Such blends may include homopolymers of propylene, homopolymers of ethylene, random propylene copolymers, and other propylene or ethylene-based polymers and blends thereof, where the blends have a core/sheath structure. The formation of such bicomponent materials, however, adds complexity to nonwoven manufacturing processes. It would be desirable, then, as one embodiment of the present invention, to provide monocomponent nonwoven fibers and fabrics having good extensibility and good spinnability in spunmelt processes.

We have found that nonwoven fibers and fabrics prepared from blends of propylene impact copolymers and propylene-based elastomers provide high cross-direction elongation and good spinnability in nonwoven manufacturing processes, especially those equipped with monocomponent spinnerets.

SUMMARY OF THE INVENTION

The present invention is directed to fibers and nonwoven compositions (e.g., fabrics) comprising a blend of at least one propylene impact copolymer ("ICP") with at least one propylene-based elastomer ("PBE"). The fibers and nonwoven materials prepared from these blends exhibit high elongation and good spinnability in spunmelt processes. In particular, the blends described herein comprise from about 45 to about 85 wt % of an ICP and from 15 to 55 wt % of a PBE, where the ICP comprises (preferably a heterophasic blend) a propylene homopolymer and a propylene ethylene copolymer having an ethylene content from about 20 to about 80 wt %, and the PBE comprises from about 5 to about 25 wt % of a $C_2$ and/or $C_4$-$C_{12}$ α-olefin comonomer and has a triad tacticity greater than about 90% and a heat of fusion less than about 75 J/g. Fibers, nonwoven compositions, and nonwoven laminates comprising the blends are provided, as well as methods for forming the blends and the fibers and compositions (such as fabrics) prepared therefrom.

DETAILED DESCRIPTION OF THE INVENTION

Fibers, nonwoven fabrics, and other nonwoven articles comprising a blend of at least one impact copolymer and at least one propylene-based elastomer (PBE) are provided herein, as well as methods for forming the same.

As used herein, the term "copolymer" is meant to include polymers having two or more monomers, optionally with other monomers, and may refer to interpolymers, terpolymers, etc. The term "polymer" as used herein includes, but is not limited to, homopolymers, copolymers, terpolymers, etc., and alloys and blends thereof. The term "polymer" as used herein also includes impact, block, graft, random, and alternating copolymers. The term "polymer" shall further include all possible geometrical configurations unless otherwise specifically stated. Such configurations may include isotactic, syndiotactic and random symmetries. The term "blend" as used herein refers to a mixture of two or more polymers. The term "elastomer" shall mean any polymer exhibiting some degree of elasticity, where elasticity is the ability of a material that has been deformed by a force (such as by stretching) to return at least partially to its original dimensions once the force has been removed.

The term "monomer" or "comonomer" as used herein can refer to the monomer used to form the polymer, i.e., the unreacted chemical compound in the form prior to polymerization, and can also refer to the monomer after it has been incorporated into the polymer, also referred to herein as a "[monomer]-derived unit", which by virtue of the polymerization reaction typically has fewer hydrogen atoms than it does prior to the polymerization reaction. Different monomers are discussed herein, including propylene monomers, ethylene monomers, and diene monomers.

"Polypropylene" as used herein includes homopolymers and copolymers of propylene or mixtures thereof. Products that include one or more propylene monomers polymerized with one or more additional monomers may be more commonly known as random copolymers (RCP) or impact copolymers (ICP). Impact copolymers may also be known in the art as heterophasic copolymers. "Propylene-based," as used herein, is meant to include any polymer comprising propylene, either alone or in combination with one or more comonomers, in which propylene is the major component (i.e., greater than 50 wt % propylene).

"Reactor grade" as used herein means a polymer that has not been chemically or mechanically treated or blended after polymerization in an effort to alter the polymer's average molecular weight, molecular weight distribution, or viscosity. Particularly excluded from those polymers described as reactor grade are those that have been visbroken or otherwise treated or coated with peroxide. For the purposes of this disclosure, however, reactor grade polymers include those polymers that are reactor blends.

"Reactor blend" as used herein means a highly dispersed and mechanically inseparable blend of two or more polymers produced in situ as the result of sequential or parallel polymerization of one or more monomers with the formation of one polymer in the presence of another, or by solution blending polymers made separately in parallel reactors. Reactor blends may be produced in a single reactor, a series of reactors, or parallel reactors and are reactor grade blends. Reactor blends may be produced by any polymerization method, including batch, semi-continuous, or continuous systems. Particularly excluded from "reactor blend" polymers comprising a blend of two or more polymers in which the polymers are blended ex situ, such as by physically or mechanically blending in a mixer, extruder, or other similar device.

"Visbreaking" as used herein is a process for reducing the molecular weight of a polymer by subjecting the polymer to chain scission. The visbreaking process also increases the MFR of a polymer and may narrow its molecular weight distribution. Several different types of chemical reactions can be employed for visbreaking propylene-based polymers. An example is thermal pyrolysis, which is accomplished by exposing a polymer to high temperatures, e.g., in an extruder at 350° C. or higher. Other approaches are exposure to powerful oxidizing agents and exposure to ionizing radiation. The most commonly used method of visbreaking in commercial practice is the addition of a prodegradant to the polymer. A prodegradant is a substance that promotes chain scission when mixed with a polymer, which is then heated under extrusion conditions. Examples of prodegradants used in commercial practice are alkyl hydroperoxides and dialkyl peroxides. These materials, at elevated temperatures, initiate a free radical chain reaction resulting in scission of polypropylene molecules. The terms "prodegradant" and "visbreaking agent" are used interchangeably herein. Polymers that have undergone chain scission via a visbreaking process are said herein to be "visbroken." Such visbroken polymer grades, particularly polypropylene grades, are often referred to in the industry as "controlled rheology" or "CR" grades.

"Catalyst system" as used herein means the combination of one or more catalysts with one or more activators and, optionally, one or more support compositions. An "activator" is any compound or component, or combination of compounds or components, capable of enhancing the ability of one or more catalysts to polymerize monomers to polymers.

Impact Copolymers

The impact copolymers ("ICPs") useful for making the fibers and fabrics of the invention comprise at least two major components, Component A and Component B. In one or more embodiments, Component A is a propylene homopolymer, and preferably an isotactic propylene homopolymer, although small amounts of a comonomer may be used to obtain particular properties. Typically such copolymers contain less than 10 wt %, or less than 6 wt %, or less than 4 wt % comonomer such as ethylene, butene, hexene or octene. The end result is usually a product with lower stiffness but with some gain in impact strength compared to homopolymer Component A.

In one or more embodiments, Component A has a narrow molecular weight distribution, Mw/Mn ("MWD"), i.e., lower than 4.5, or lower than 4.0 or lower than 3.5, or lower than 3.0. In certain embodiments, these molecular weight distributions are obtained in the absence of visbreaking using peroxide or other post reactor treatment designed to reduce molecular weight. Component A may have a weight average molecular weight (Mw, as determined by GPC) of at least 100,000, or at least 200,000, and a melting point (Tm) of at least 145° C., preferably at least 150° C. Methods for determining Tm are described in detail below.

In one or more embodiments, Component B may be a copolymer comprising propylene and comonomer. The comonomer is preferably ethylene, although other propylene copolymers or terpolymers may be suitable depending on the particular product properties desired. For example propylene/butene, hexene or octene copolymers may be used. In some embodiments, Component B is a copolymer comprising at least 20 wt % isotactic propylene, or from about 20 to about 80 wt % propylene, or from about 20 to about 70 wt % propylene, or from about 30 to about 60 wt % propylene; and from about 20 to about 80 wt % comonomer, or from about 30 to about 80 wt % comonomer, or from about 40 to about 70 wt % comonomer, such as ethylene. In certain embodiments, Component B may consist essentially of propylene and from about 20 to about 80 wt % ethylene, or from about 30 to about 70 wt % ethylene, or from about 40 to about 60 wt % ethylene.

In one or more embodiments, Component B may have an intrinsic viscosity greater than 1.00 dl/g, or greater than 1.50 dl/g, or greater than 2.00 d/g. The term "intrinsic viscosity" or "IV" is used herein to mean the viscosity of a solution of polymer such as Component B in a given solvent at a given temperature, when the polymer composition is at infinite dilution. According to the ASTM D1601 standard, IV measurement utilizes a standard capillary viscosity measuring device, in which the viscosity of a series of concentrations of the polymer in the solvent at a given temperature are determined. For Component B, decalin is a suitable solvent and a typical temperature is 135° C. From the values of the viscosity of solutions of varying concentrations, the viscosity at infinite dilution can be determined by extrapolation.

Component B may have a composition distribution breadth index (CDBI) of greater than 60%, or greater than 65%, or greater than 70%, or greater than 75%, or greater than 80%. CDBI is described in detail U.S. Pat. No. 5,382,630, which is incorporated by reference herein in its entirety. CDBI is defined as the weight percent of the copolymer molecules having a comonomer content within 50% of the median total molar comonomer content.

The melt flow rate ("MFR") of the ICPs suitable for use herein depends on the desired end use, but for meltblown fibers and fabrics is typically in the range of from about 10 to about 4000 g/10 min, or from about 50 to about 3000 g/10 min, or from about 100 to about 2000 g/10 min, or from about 400 to about 2000 g/10 min. MFR is determined by a conventional procedure such as ASTM-1238 (Condition L).

For spunbond fibers and fabrics, the MFR is typically in the range of from about 5 to about 400 g/10 min, or from about 10 to about 200 g/10 min, or from about 10 to about 100 g/10 min, or from about 15 to about 70 g/10 min, or from about 20 to about 50 g/10 min.

In one or more embodiments, the ICPs comprise from about 40 to about 95 wt % Component A and from about 5 to about 60 wt % Component B, or from about 50 to about 90 wt % Component A and from about 10 to about 50 wt % Component B, or from about 60 to about 90 wt % Component A and from about 10 to about 40 wt % Component B. In some embodiments, the ICP may consist essentially of Components A and B. In the same or other embodiments, the overall comonomer (i.e., ethylene) content may be in the range of from about 30 to about 70 wt %, or from about 40 to about 60 wt %.

The ICPs suitable for use in the polymer blends of the present invention may, in some embodiments, be reactor blends, meaning that Components A and B are not physically or mechanically blended together after polymerization but are interpolymerized in at least one reactor, often in two or more reactors in series. The final ICP as obtained from the reactor or reactors, however, can be blended with various other components including other polymers or additives. In other embodiments, however, the ICPs described herein may be formed by producing Components A and B in separate reactors and physically blending the components once they have exited their respective reactors.

In one or more embodiments herein, the ICPs may be described as "heterophasic." As used herein, heterophasic means that the polymers have two or more phases. Commonly, heterophasic ICPs comprise a matrix component in one phase and a second rubber component phase dispersed within the matrix. In one or more embodiments herein, the ICPs comprise a matrix phase comprising a propylene homopolymer (Component A) and a dispersed phase comprising a propylene-ethylene copolymer (Component B). The copolymer component (Component B) has rubbery characteristics and provides impact resistance, while the matrix component (Component A) provides overall stiffness.

A variety of additives may be incorporated into the ICP for various purposes. For example, such additives include, but are not limited to, stabilizers, antioxidants, fillers, colorants, nucleating agents and mold release agents. Primary and secondary antioxidants include, for example, hindered phenols, hindered amines, and phosphates. Nucleating agents include, for example, sodium benzoate and talc. Dispersing agents such as Acrowax C can also be included. Slip agents include, for example, oleamide and erucamide. Catalyst deactivators are also commonly used, for example, calcium stearate, hydrotalcite, and calcium oxide.

The ICP compositions suitable for use in the present invention may be prepared by conventional polymerization techniques, such as a two-step gas phase process using Ziegler-Natta catalysis. See for example U.S. Pat. No. 4,379,759, which is incorporated by reference herein in its entirety. It is possible, although sometimes impractical, to produce ICPs in a single reactor. The ICPs for use in the invention may also be produced in reactors operated in series. In such series operations, the first polymerization (polymerization of Component A) is preferably a liquid slurry or solution polymerization process, and the second polymerization (polymerization of Component B) is preferably carried out in the gas phase. In one or more embodiments, hydrogen may be added to one or both reactors to control molecular weight, IV and/or MFR. The use of hydrogen for such purposes is well known to those skilled in the art.

Metallocene-based catalyst systems may also be used to produce the ICP compositions described herein. Current particularly suitable metallocenes are those in the generic class of bridged, substituted bis(cyclopentadienyl) metallocenes, specifically bridged, substituted bis(indenyl) metallocenes known to produce high molecular weight, high melting, highly isotactic propylene polymers. Generally speaking, those of the generic class disclosed in U.S. Pat. No. 5,770,753 (incorporated herein by reference in its entirety) are suitable.

We have found that the ICPs described above are particularly useful for producing nonwoven fabrics and multilayer laminates when blended with one or more propylene-based elastomers (PBEs) as described below. As used herein "nonwoven fabric" means a web structure of individual fibers or filaments that are interlaid, but not in an identifiable manner as in a knitted fabric.

Propylene-Based Elastomers

In certain embodiments of the present invention, the polymer blends used to form the fibers and fabrics described herein comprise one or more propylene-based elastomers ("PBEs"), which comprise propylene and from about 5 to about 25 wt % of one or more comonomers selected from ethylene and/or $C_4$-$C_{12}$ α-olefins. In one or more embodiments, the α-olefin comonomer units may be derived from ethylene, butene, pentene, hexene, 4-methyl-1-pentene, octene, or decene. The embodiments described below are discussed with reference to ethylene as the α-olefin comonomer, but the embodiments are equally applicable to other copolymers with other α-olefin comonomers. In this regard, the copolymers may simply be referred to as propylene-based polymers with reference to ethylene as the α-olefin.

In one or more embodiments, the PBE may include at least about 5 wt %, at least about 6 wt %, at least about 7 wt %, or at least about 8 wt %, or at least about 9 wt %, or at least about 10 wt %, or at least about 12 wt % ethylene-derived units. In those or other embodiments, the PBE may include up to about 30 wt %, or up to about 25 wt %, or up to about 22 wt %, or up to about 20 wt %, or up to about 19 wt %, or up to about 18 wt %, or up to about 17 wt % ethylene-derived units, where the percentage by weight is based upon the total weight of the propylene-derived and α-olefin derived units. Stated another way, the PBE may include at least about 70 wt %, or at least about 75 wt %, or at least about 80 wt %, or at least about 81 wt % propylene-derived units, or at least about 82 wt % propylene-derived units, or at least about 83 wt % propylene-derived units; and in these or other embodiments, the PBE may include up to about 95 wt %, or up to about 94 wt %, or up to about 93 wt %, or up to about 92 wt %, or up to about 90 wt %, or up to about 88 wt % propylene-derived units, where the percentage by weight is based upon the total weight of the propylene-derived and α-olefin derived units. In certain embodiments, the PBE may comprise from about 5 to about 25 wt % ethylene-derived units, or from about 9 to about 18 wt % ethylene-derived units.

The PBEs of one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

In one or more embodiments, the Tm of the PBE (as determined by DSC) is less than about 115° C., or less than about 110° C., or less than about 100° C., or less than about 95° C., or less than about 90° C.

In one or more embodiments, the PBE may be characterized by its heat of fusion (Hf), as determined by DSC. In one or more embodiments, the PBE may have an Hf that is at least about 0.5 J/g, or at least about 1.0 J/g, or at least about 1.5 J/g, or at least about 3.0 J/g, or at least about 4.0 J/g, or at least about 5.0 J/g, or at least about 6.0 J/g, or at least about 7.0 J/g. In these or other embodiments, the PBE may be characterized by an Hf of less than about 75 J/g, or less than about 70 J/g, or less than about 60 J/g, or less than about 50 J/g, or less than about 45 J/g, or less than about 40 J/g, or less than about 35 J/g, or less than about 30 J/g.

As used within this specification, DSC procedures for determining Tm and Hf include the following. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a DSC (Perkin Elmer Pyris One Thermal Analysis System) and cooled to about −50° C. to about −70° C. The sample is heated at 10° C./min to attain a final temperature of about 200° C. The sample is kept at 200° C. for 5 minutes and a second cool-heat cycle is performed. Events from both cycles are recorded. The thermal output is recorded as the area under the melting peak of the sample, which typically occurs between about 0° C. and about 200° C. It is measured in Joules and is a measure of the Hf of the polymer.

The PBE can have a triad tacticity of three propylene units, as measured by 13C NMR, of 75% or greater, 80% or greater, 85% or greater, 90% or greater, 92% or greater, 95% or greater, or 97% or greater. In one or more embodiments, the triad tacticity may range from about 75 to about 99%, or from about 80 to about 99%, or from about 85 to about 99%, or from about 90 to about 99%, or from about 90 to about 97%, or from about 80 to about 97%. Triad tacticity is determined by the methods described in U.S. Pat. No. 7,232,871.

The PBE may have a tacticity index ranging from a lower limit of 4 or 6 to an upper limit of 8 or 10 or 12. The tacticity index, expressed herein as "m/r", is determined by $^{13}$C nuclear magnetic resonance ("NMR"). The tacticity index, m/r, is calculated as defined by H. N. Cheng in 17 MACROMOLECULES 1950 (1984), incorporated herein by reference. The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50.

In one or more embodiments, the PBE may have a % crystallinity of from about 0.5% to about 40%, or from about 1% to about 30%, or from about 5% to about 25%, determined according to DSC procedures. Crystallinity may be determined by dividing the Hf of a sample by the Hf of a 100% crystalline polymer, which is assumed to be 189 joules/gram for isotactic polypropylene or 350 joules/gram for polyethylene.

In one or more embodiments, the PBE may have a density of from about 0.85 g/cm$^3$ to about 0.92 g/cm$^3$, or from about 0.86 g/cm$^3$ to about 0.90 g/cm$^3$, or from about 0.86 g/cm$^3$ to about 0.89 g/cm$^3$ at room temperature, as measured per the ASTM D-792 test method.

In one or more embodiments, the PBE can have a melt index (MI) (ASTM D-1238, 2.16 kg @ 190° C.), of less than or equal to about 100 g/10 min, or less than or equal to about 50 g/10 min, or less than or equal to about 25 g/10 min, or less than or equal to about 10 g/10 min, or less than or equal to about 9.0 g/10 min, or less than or equal to about 8.0 g/10 min, or less than or equal to about 7.0 g/10 min.

In one or more embodiments, the PBE may have a melt flow rate (MFR), as measured according to ASTM D-1238 (2.16 kg weight @ 230° C.), greater than about 1 g/10 min, or greater than about 2 g/10 min, or greater than about 5 g/10 min, or greater than about 8 g/10 min, or greater than about 10 g/10 min. In the same or other embodiments, the PBE may have an MFR less than about 500 g/10 min, or less than about 400 g/10 min, or less than about 300 g/10 min, or less than about 200 g/10 min, or less than about 100 g/10 min, or less than about 75 g/10 min, or less than about 50 g/10 min. In certain embodiments, the PBE may have an MFR from about 1 to about 100 g/10 min, or from about 2 to about 75 g/10 min, or from about 5 to about 50 g/10 min.

In one or more embodiments, the PBE may be a reactor grade polymer, as defined above. In other embodiments, the PBE may be a polymer that has been visbroken after exiting the reactor to increase the MFR. "Visbreaking" as used herein is a process for reducing the molecular weight of a polymer by subjecting the polymer to chain scission. The visbreaking process also increases the MFR of a polymer and may narrow its molecular weight distribution.

In one or more embodiments, the PBE may have a Mooney viscosity [ML (1+4) @ 125° C.], as determined according to ASTM D-1646, of less than about 100, or less than about 75, or less than about 50, or less than about 30.

In one or more embodiments, the PBE may have a g' index value of 0.95 or greater, or at least 0.97, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the polymer and $\eta_l$ is the intrinsic viscosity of a linear polymer of the same viscosity-averaged molecular weight (Mv) as the polymer. $\eta_l=KMv\alpha$, K and $\alpha$ are measured values for linear polymers and should be obtained on the same instrument as the one used for the g' index measurement.

In one or more embodiments, the PBE may have a weight average molecular weight (Mw) of from about 50,000 to about 5,000,000 g/mol, or from about 75,000 to about 1,000,000 g/mol, or from about 100,000 to about 500,000 g/mol, or from about 125,000 to about 300,000 g/mol. In the same or other embodiments, the PBE may have a number average molecular weight (Mn) of from about 2,500 to about 2,500,000 g/mole, or from about 5,000 to about 500,000 g/mole, or from about 10,000 to about 250,000 g/mole, or from about 25,000 to about 200,000 g/mole. In the same or other embodiments, the PBE may have a Z-average molecular weight (Mz) of from about 10,000 to about 7,000,000 g/mole, or from about 50,000 to about 1,000,000 g/mole, or from about 80,000 to about 700,000 g/mole, or from about 100,000 to about 500,000 g/mole. In certain embodiments, the molecular weight distribution (MWD, equal to Mw/Mn) of the PBE may be from about 1 to about 40, or from about 1 to about 15, or from about 1.8 to about 5, or from about 1.8 to about 3.

Techniques for determining the molecular weight (Mn, Mw and Mz) and MWD may be found in U.S. Pat. No. 4,540,753 (Cozewith, Ju and Ver Strate) (which is incorporated by reference herein for purposes of U.S. practices) and references cited therein and in Macromolecules, 1988, Vol. 21, pp. 3360-3371 (Ver Strate et al.), which is herein incorporated by reference for purposes of U.S. practices, and references cited therein. For example, molecular weight may be determined by size exclusion chromatography (SEC) by using a Waters 150 gel permeation chromatograph equipped with the differential refractive index detector and calibrated using polystyrene standards.

Optionally, the PBE may also include one or more dienes. The term "diene" is defined as a hydrocarbon compound that has two unsaturation sites, i.e., a compound having two double bonds connecting carbon atoms. Depending on the context, the term "diene" in this patent refers broadly to either a diene monomer prior to polymerization, e.g., forming part of the polymerization medium, or a diene monomer after polymerization has begun (also referred to as a diene monomer unit or a diene-derived unit). Exemplary dienes suitable for use in the present invention include, but are not limited to, butadiene, pentadiene, hexadiene (e.g., 1,4-hexadiene), heptadiene (e.g., 1,6-heptadiene), octadiene (e.g., 1,7-octadiene), nonadiene (e.g., 1,8-nonadiene), decadiene (e.g., 1,9-decadiene), undecadiene (e.g., 1,10-undecadiene), dodecadiene (e.g., 1,11-dodecadiene), tridecadiene (e.g., 1,12-tridecadiene), tetradecadiene (e.g., 1,13-tetradecadiene), pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and polybutadienes having a molecular weight (Mw) of less than 1,000 g/mol. Examples of straight chain acyclic dienes include, but are not limited to 1,4-hexadiene and 1,6-octadiene. Examples of branched chain acyclic dienes include, but are not limited to 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to tetrahydroindene; norbornadiene; methyltetrahydroindene; dicyclopentadiene; bicyclo(2.2.1)hepta-2,5-diene; and alkenyl-, alkylidene-, cycloalkenyl-, and cylcoalkylidene norbornenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to vinyl cyclohexene, allyl cyclohexene, vinylcyclooctene, 4-vinylcyclohexene, allyl cyclodecene, vinylcyclododecene, and tetracyclododecadiene. In some embodiments of the present invention, the diene is selected from 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD), and combinations thereof. In one or more embodiments, the diene is ENB.

In some embodiments, the PBE may optionally comprise from 0.05 to about 6 wt % diene-derived units. In further embodiments, the polymer comprises from about 0.1 to about 5.0 wt % diene-derived units, or from about 0.25 to about 3.0 wt % diene-derived units, or from about 0.5 to about 1.5 wt % diene-derived units.

In one or more embodiments, the PBE can optionally be grafted (i.e. "functionalized") using one or more grafting monomers. As used herein, the term "grafting" denotes covalent bonding of the grafting monomer to a polymer chain of the PBE.

The grafting monomer can be or include at least one ethylenically unsaturated carboxylic acid or acid derivative, such as an acid anhydride, ester, salt, amide, imide, acrylates or the like. Illustrative monomers include but are not limited to acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo (2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer.

In one or more embodiments, the grafted PBE comprises from about 0.5 to about 10 wt % ethylenically unsaturated carboxylic acid or acid derivative, more preferably from about 0.5 to about 6 wt %, more preferably from about 0.5 to about 3 wt %; in other embodiments from about 1 to about 6 wt %, more preferably from about 1 to about 3 wt %. In a preferred embodiment wherein the graft monomer is maleic anhydride, the maleic anhydride concentration in the grafted polymer is preferably in the range of about 1 to about 6 wt. %, preferably at least about 0.5 wt % and highly preferably about 1.5 wt %.

Preparation of Propylene-Based Elastomers

Polymerization of the PBE is conducted by reacting monomers in the presence of a catalyst system described herein at a temperature of from 0° C. to 200° C. for a time of from 1 second to 10 hours. Preferably, homogeneous conditions are used, such as a continuous solution process or a bulk polymerization process with excess monomer used as diluent. The continuous process may use some form of agitation to reduce concentration differences in the reactor and maintain steady state polymerization conditions. The heat of the polymerization reaction is preferably removed by cooling of the polymerization feed and allowing the polymerization to heat up to the polymerization, although internal cooling systems may be used.

Further description of exemplary methods suitable for preparation of the PBEs described herein may be found in U.S. Pat. No. 6,881,800, which is incorporated by reference herein for purposes of U.S. practice.

The triad tacticity and tacticity index of the PBE may be controlled by the catalyst, which influences the stereoregularity of propylene placement, the polymerization temperature, according to which stereoregularity can be reduced by increasing the temperature, and by the type and amount of a comonomer, which tends to reduce the level of longer propylene derived sequences.

Too much comonomer may reduce the crystallinity provided by the crystallization of stereoregular propylene derived sequences to the point where the material lacks strength; too little and the material may be too crystalline. The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+30.045X2, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis.

Reference is made to U.S. Pat. No. 6,525,157, whose test methods are also fully applicable for the various measurements referred to in this specification and claims and which contains more details on GPC measurements, the determination of ethylene content by NMR and the DSC measurements.

The catalyst may also control the stereoregularity in combination with the comonomer and the polymerization temperature. The PBEs described herein are prepared using one or more catalyst systems. As used herein, a "catalyst system" comprises at least a transition metal compound, also referred to as catalyst precursor, and an activator. Contacting the transition metal compound (catalyst precursor) and the activator in solution upstream of the polymerization reactor or in the polymerization reactor of the disclosed processes yields the catalytically active component (catalyst) of the catalyst system. Any given transition metal compound or catalyst precursor can yield a catalytically active component (catalyst) with various activators, affording a wide array of catalysts deployable in the processes of the present invention. Catalyst systems of the present invention comprise at least one transition metal compound and at least one activator. However, catalyst systems of the current disclosure may also comprise more than one transition metal compound in combination with one or more activators. Such catalyst systems may optionally include impurity scavengers. Each of these components is described in further detail below.

In one or more embodiments of the present invention, the catalyst systems used for producing the PBEs comprise a metallocene compound. In some embodiments, the metallocene compound is a bridged bisindenyl metallocene having the general formula $(In^1)Y(In^2)MX_2$, where $In^1$ and $In^2$ are (preferably identical) substituted or unsubstituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal. $In^1$ and $In^2$ may be substituted or unsubstituted. If $In_1$ and $In_2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and N- or P-containing alkyl or aryl. Exemplary metallocene compounds of this type include, but are not limited to, μ-dimethylsilylbis(indenyl)hafniumdimethyl and μ-dimethylsilylbis(indenyl)zirconiumdimethyl.

In other embodiments, the metallocene compound may be a bridged bisindenyl metallocene having the general formula $(In^1)Y(In^2)MX_2$, where $In^1$ and $In^2$ are (preferably identical) 2,4-substituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal. $In^1$ and $In^2$ are substituted in the 2 position by a methyl group and in the 4 position by a substituent selected from the group consisting of $C_5$ to $C_{15}$ aryl, $C_6$ to $C_{25}$ alkylaryl, and N- or P-containing alkyl or aryl. Exemplary metallocene compounds of this type include, but are not limited to, (μ-dimethylsilyl)bis(2-methyl-4-(3,'5'-di-tert-butylphenyl)indenyl)zirconiumdimethyl, (μ-dimethylsilyl)bis(2-methyl-4-(3,'5'-di-tert-butylphenyl)indenyl)hafniumdimethyl, (μ-dimethylsilyl)bis(2-methyl-4-naphthylindenyl)zirconiumdimethyl, (μ-dimethylsilyl)bis(2-methyl-4-naphthylindenyl)hafniumdimethyl, (μ-dimethylsilyl)bis(2-methyl-4-(N-carbazyl)indenyl)zirconiumdimethyl, and (μ-dimethylsilyl)bis(2-methyl-4-(N-carbazyl)indenyl)hafniumdimethyl.

Alternatively, in one or more embodiments of the present invention, the metallocene compound may correspond to one or more of the formulas disclosed in U.S. Pat. No. 7,601,666. Such metallocene compounds include, but are not limited to, dimethylsilyl bis(2-(methyl)-5,5,8,8-tetramethyl-5,6,7,8-tetrahydrobenz(f)indenyl)hafnium dimethyl, diphenylsilyl bis(2-(methyl)-5,5,8,8-tetramethyl-5,6,7,8-tetrahydrobenz(f)indenyl)hafnium dimethyl, diphenylsilyl bis (5,5,8,8-tetramethyl-5,6,7,8-tetrahydrobenz(f)indenyl)hafnium dimethyl, diphenylsilyl bis(2-(methyl)-5,5,8,8-tetramethyl-5,6,7,8-tetrahydrobenz(f)indenyl)zirconium dichloride, and cyclo-propylsilyl bis(2-(methyl)-5,5,8,8-tetramethyl-5,6,7,8-tetrahydrobenz(f)indenyl)hafnium dimethyl.

In one or more embodiments of the present invention, the activators of the catalyst systems used to produce PBEs comprise a cationic component. In some embodiments, the cationic component has the formula $[R^1R^2R^3AH]^+$, where A is nitrogen, $R^1$ and $R^2$ are together a $—(CH_2)_a—$ group, where a is 3, 4, 5 or 6 and form, together with the nitrogen atom, a 4-, 5-, 6- or 7-membered non-aromatic ring to which, via adjacent ring carbon atoms, optionally one or more aromatic or heteroaromatic rings may be fused, and $R^3$ is $C_1$, $C_2$, $C_3$, $C_4$ or $C_5$ alkyl, or N-methylpyrrolidinium or N-methylpiperidinium. In other embodiments, the cationic component has the formula $[R_nAH]^+$, where A is nitrogen, n is 2 or 3, and all R are identical and are $C_1$ to $C_3$ alkyl groups, such as for example trimethylammonium, trimethylanilinium, triethylammonium, dimethylanilinium, or dimethylammonium.

In one or more embodiments of the present invention, the activators of the catalyst systems used to produce the PBEs comprise an anionic component, [Y]⁻. In some embodiments, the anionic component is a non-coordinating anion (NCA), having the formula $[B(R^4)_4]^-$, where $R^4$ is an aryl group or a substituted aryl group, of which the one or more substituents are identical or different and are selected from the group consisting of alkyl, aryl, a halogen atom, halogenated aryl, and haloalkylaryl groups. In one or more embodiments, the substituents are perhalogenated aryl groups, or perfluorinated aryl groups, including but not limited to perfluorophenyl, perfluoronaphthyl and perfluorobiphenyl.

Together, the cationic and anionic components of the catalysts systems described herein form an activator compound. In one or more embodiments of the present invention, the activator may be N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis(3,5-bis(trifluoromethyl)phenyl)borate, triphenylcarbenium-tetra(perfluorophenyl)borate, triphenylcarbenium-tetra(perfluoronaphthyl)borate, triphenylcarbenium-tetrakis(perfluorobiphenyl)borate, or triphenylcarbenium-tetrakis(3,5-bis(trifluoromethyl)phenyl)borate.

Any catalyst system resulting from any combination of a metallocene compound, a cationic activator component, and an anionic activator component mentioned in the preceding paragraphs shall be considered to be explicitly disclosed herein and may be used in accordance with the present invention in the polymerization of one or more olefin monomers. Also, combinations of two different activators can be used with the same or different metallocene(s).

Suitable activators for the processes of the present invention also include alominoxanes (or alumoxanes) and aluminum alkyls. Without being bound by theory, an alumoxane is typically believed to be an oligomeric aluminum compound represented by the general formula $(R^x-Al-O)_n$, which is a cyclic compound, or $R^x(R^x-Al-O)_n AlR^x_2$, which is a linear compound. Most commonly, alumoxane is believed to be a mixture of the cyclic and linear compounds. In the general alumoxane formula, $R^x$ is independently a $C_1$-$C_{20}$ alkyl radical, for example, methyl, ethyl, propyl, butyl, pentyl, isomers thereof, and the like, and n is an integer from 1-50. In one or more embodiments, $R^x$ is methyl and n is at least 4. Methyl alumoxane (MAO), as well as modified MAO containing some higher alkyl groups to improve solubility, ethyl alumoxane, iso-butyl alumoxane, and the like are useful for the processes disclosed herein.

Further, the catalyst systems suitable for use in the present invention may contain, in addition to the transition metal compound and the activator described above, additional activators (co-activators) and/or scavengers. A co-activator is a compound capable of reacting with the transition metal complex, such that when used in combination with an activator, an active catalyst is formed. Co-activators include alumoxanes and aluminum alkyls.

In some embodiments of the invention, scavengers may be used to "clean" the reaction of any poisons that would otherwise react with the catalyst and deactivate it. Typical aluminum or boron alkyl components useful as scavengers are represented by the general formula $R^xJZ_2$ where J is aluminum or boron, $R^x$ is a $C_1$-$C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide ($OR^x$) and the like. Exemplary aluminum alkyls include triethylaluminum, diethylaluminum chloride, ethylaluminum dichloride, tri-iso-butylaluminum, tri-n-octylaluminum, tri-n-hexylaluminum, trimethylaluminum and combinations thereof. Exemplary boron alkyls include triethylboron. Scavenging compounds may also be alumoxanes and modified alumoxanes including methylalumoxane and modified methylalumoxane.

In some embodiments, the catalyst system used to produce the PBEs described herein includes a transition metal component which is a bridged bisindenyl metallocene having the general formula $(In^1)Y(In^2)MX_2$, where $In^1$ and $In^2$ are identical substituted or unsubstituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal. $In^1$ and $In^2$ may be substituted or unsubstituted. If $In_1$ and $In_2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and N- or P-containing alkyl or aryl. In one or more embodiments, the transition metal component used to produce the propylene-based polymers is μ-dimethylsilylbis(indenyl)hafniumdimethyl.

Polymer Blends

Polymer blends according to the present invention comprise at least one impact copolymer (ICP) and at least one propylene-based elastomer (PBE) as previously described. In one or more embodiments, the blends may comprise from about 40 to about 85 wt % ICP, or from about 40 to about 80 wt % ICP, or from about 45 to about 80 wt % ICP, or from about 45 to about 75 wt % ICP, or from about 45 to about 70 wt % ICP, or from about 50 to about 65 wt % ICP. In the same or other embodiments, the blends may comprise from about 15 to about 60 wt % PBE, or from about 20 to about 60 wt % PBE, or from about 20 to about 55 wt % PBE, or from about 25 to about 55 wt % PBE, or from about 30 to about 55 wt % PBE, or from about 35 to about 50 wt % PBE. Stated differently, the blends may comprise greater than about 10 wt % PBE, or greater than about 15 wt % PBE, or greater than about 20 wt % PBE, or greater than about 25 wt % PBE, or greater than about 30 wt % PBE, or greater than about 35 wt % PBE.

A variety of additives may be incorporated into the polymer blends described herein, depending upon the intended purpose. For example, when the blends are used to form fibers and nonwoven fabrics, such additives may include but are not limited to stabilizers, antioxidants, fillers, colorants, nucleating agents, dispersing agents, mold release agents, slip agents, fire retardants, plasticizers, pigments, vulcanizing or curative agents, vulcanizing or curative accelerators, cure retarders, processing aids, tackifying resins, and the like. Other additives may include fillers and/or reinforcing materials, such as carbon black, clay, talc, calcium carbonate, mica, silica, silicate, combinations thereof, and the like. Primary and secondary antioxidants include, for example, hindered phenols, hindered amines, and phosphates. Nucleating agents include, for example, sodium benzoate and talc. Also, to improve crystallization rates, other nucleating agents may also be employed such as Ziegler-Natta olefin products or other highly crystalline polymers. Other additives such as dispersing agents, for example, Acrowax C, can also be included. Slip agents include, for example, oleamide and erucamide. Catalyst deactivators are also commonly used, for example, calcium stearate, hydrotalcite, and calcium oxide, and/or other acid neutralizers known in the art.

Further, in some exemplary embodiments, additives may be incorporated into the polymer blends directly or as part of a masterbatch, i.e., an additive package containing several additives to be added at one time in predetermined proportions. In one or more embodiments herein, the fiber of the present invention further comprise a masterbatch comprising a slip agent. The masterbatch may be added in any suitable amount to accomplish the desired result. For example, a masterbatch comprising a slip additive may be used in an amount ranging from about 0.1 to about 10 wt %, or from about 0.25 to about 7.5 wt %, or from about 0.5 to about 5 wt %, or from about 1 to about 5 wt %, or from about 2 to about 4 wt %, based on the total weight of the polymer blend and the masterbatch. In an embodiment, the masterbatch comprises erucamide as the slip additive.

Fibers, Nonwoven Compositions, and Laminates Prepared from Polymer Blends

In one or more embodiments, the present invention is directed to meltspun (e.g., meltblown or spunbond) fibers and nonwoven compositions (e.g. fabrics) comprising the polymer blends described above. As used herein, "meltspun nonwoven composition" refers to a composition having at least one meltspun layer, and does not require that the entire composition be meltspun or nonwoven. In some embodiments, the nonwoven compositions additionally comprise one or more layers positioned on one or both sides of the nonwoven layer(s) comprising the ICP/PBE blend. As used herein, "nonwoven" refers to a textile material that has been produced by methods other than weaving. In nonwoven fabrics, the fibers are processed directly into a planar sheet-like fabric structure and then are either bonded chemically, thermally, or interlocked mechanically (or both) to achieve a cohesive fabric.

The present invention is directed not only to fibers and nonwoven compositions, but also to processes for forming nonwoven compositions comprising the polymer blends described herein. In one or more embodiments, such methods comprise the steps of forming a molten polymer composition comprising a blend of at least one ICP and at least one PBE as described above, and forming fibers comprising the polymer blend. In certain embodiments, the fibers may have a thickness from about 1 to about 10 denier, or from about 2 to about 8 denier, or from about 4 to about 6 denier. Although commonly referred to in the art and used herein for convenience as an indicator of thickness, denier is more accurately described as the linear mass density of a fiber. A denier is the mass (in grams) of a fiber per 9,000 meters. In practice, measuring 9,000 meters may be both time-consuming and wasteful. Usually, a sample of lesser length (i.e., 900 meters, 90 meters, or any other suitable length) is weighed and the result multiplied by the appropriate factor to obtain the denier of the fiber. In the same or other embodiments, the fibers may be monocomponent fibers or bicomponent fibers. Preferably, the fibers are monocomponent fibers, meaning that the fibers have a consistent composition throughout their cross-section.

In some embodiments, the methods further comprise forming a nonwoven composition from the fibers. In further embodiments, the nonwoven composition formed from the ICP/PBE blend is employed as a facing layer, and the process may further comprise the steps of forming one or more nonwoven elastic layers, and disposing the facing layer comprising the ICP/PBE blend upon the elastic layer. Optionally, two or more facing layers may be disposed upon the elastic layer or layers on opposite sides, such that the elastic layers are sandwiched between the facing layers. In one or more embodiments, the elastic layer or layers may comprise a PBE having the composition and properties described above. In certain embodiments, nonwoven compositions comprising ICP/PBE blends may be described as extensible. "Extensible," as used herein, means any fiber or nonwoven composition that yields or deforms (i.e., stretches) upon application of a force. While many extensible materials are also elastic, the term extensible also encompasses those materials that remain extended or deformed upon removal of the force. When an extensible facing layer is used in combination with an elastic core layer, desirable aesthetic properties may result because the extensible layer permanently deforms when the elastic layer to which it is attached stretches and retracts. This results in a wrinkled or textured outer surface with a soft feel that is particularly suited for articles in which the facing layer is in contact with a wearer's skin.

The fibers and nonwoven compositions of the present invention can be formed by any method known in the art. For example, the nonwoven compositions may be produced by a meltblown or spunbond process. In certain embodiments herein, the layer or layers of the nonwoven compositions of the invention are produced by a spunbond process. When the compositions further comprise one or more elastic layers, the elastic layers may be produced by a meltblown process, by a spunbond or spunlace process, or by any other suitable nonwoven process.

The nonwoven layer or layers described herein may be composed primarily of a blend of an ICP and a PBE as described previously. In one or more embodiments, the nonwoven compositions may have a basis weight of from about 10 to about 75 g/m$^2$ ("gsm"), or from about 15 to about 65 gsm, or from about 20 to about 55 gsm, or from about 22 to about 53 gsm, or from about 24 to about 51 gsm, or from about 25 to about 50 gsm. In the same or other embodiments, the nonwovens may have a tensile strength in the machine direction (MD) from about 5 to about 65 N/5 cm, or from about 7 to about 60 N/5 cm, or from about 10 to about 55 N/5 cm, or from about 10 to about 50 N/5 cm, or from about 15 to about 45 N/5 cm. Stated differently, the nonwovens may have an MD tensile strength greater than about 5 N/5 cm, or greater than about 10 N/5 cm, or greater than about 15 N/5 cm, or greater than about 20 N/5 cm. In the same or other embodiments, the nonwovens may have a tensile strength in the cross direction (CD) from about 5 to about 55 N/5 cm, or from about 7 to about 50 N/5 cm, or from about 10 to about 45 N/5 cm, or from about 10 to about 40 N/5 cm, or from about 15 to about 35 N/5 cm. Stated differently, the nonwovens may have an MD tensile strength greater than about 5 N/5 cm, or greater than about 10 N/5 cm, or greater than about 15 N/5 cm, or greater than about 20 N/5 cm.

In one or more embodiments, the nonwoven compositions may have a peak elongation in the machine direction (MD) greater than about 70%, or greater than about 75%, or greater than about 80%, or greater than about 85%, or greater than about 90%, or greater than about 95%, or greater than about 100%. In the same or other embodiments, the nonwoven compositions may have a peak elongation in the cross direction (CD) greater than about 80%, or greater than about 85%, or greater than about 90%, or greater than about 100%, or greater than about 105%, or greater than about 110%, or greater than about 115%, or greater than about 120%. Tensile strength and elongation are determined in accordance with ASTM D882.

As used herein, "meltblown fibers" and "meltblown compositions" (or "meltblown fabrics") refer to fibers formed by extruding a molten thermoplastic material at a certain processing temperature through a plurality of fine, usually circular, die capillaries as molten threads or filaments into high velocity, usually hot, gas streams which attenuate the filaments of molten thermoplastic material to reduce their diameter, which may be to microfiber diameter. Thereafter, the meltblown fibers are carried by the high velocity gas stream and are deposited on a collecting surface to form a web or nonwoven fabric of randomly dispersed meltblown fibers. Such a process is generally described in, for example, U.S. Pat. Nos. 3,849,241 and 6,268,203. Meltblown fibers are microfibers that are either continuous or discontinuous, and, depending on the resin, may be smaller than about 10 microns (for example, for high MFR isotactic polypropylene resins such as PP3746G or Achieve™ 6936G1, available from ExxonMobil Chemical Company); whereas for certain resins (for example, Vistamaxx™ propylene-based elastomer, available from ExxonMobil Chemical Company) or certain high throughput processes such as those described herein, meltblown fibers may have diameters greater than 10 microns, such as from about 10 to about 30 microns, or about 10 to about 15 microns. The term meltblowing as used herein is meant to encompass the meltspray process.

Commercial meltblown processes utilize extrusion systems having a relatively high throughput, in excess of 0.3 grams per hole per minute ("ghm"), or in excess of 0.4 ghm, or in excess of 0.5 ghm, or in excess of 0.6 ghm, or in excess of 0.7 ghm. The nonwoven compositions of the present invention may be produced using commercial meltblown processes, preferably a high pressure meltblown process available from Biax-Fiberfilm Corporation, or in test or pilot scale processes. In one or more embodiments of the present invention, the fibers used to form the nonwoven compositions are formed using an extrusion system having a throughput rate of from about 0.01 to about 3.0 ghm, or from about 0.1 to about 2.0 ghm, or from about 0.3 to about 1.0 ghm.

In a typical spunbond process, polymer is supplied to a heated extruder to melt and homogenize the polymers. The extruder supplies melted polymer to a spinneret where the polymer is fiberized as passed through fine openings arranged in one or more rows in the spinneret, forming a curtain of filaments. The filaments are usually quenched with air at a low temperature, drawn, usually pneumatically, and deposited on a moving mat, belt or "forming wire" to form the nonwoven composition. See, for example, in U.S. Pat. Nos. 4,340,563; 3,692,618; 3,802,817; 3,338,992; 3,341,394; 3,502,763; and U.S. Pat. No. 3,542,615. The term spunbond as used herein is meant to include spunlace processes, in which the filaments are entangled to form a web using high-speed jets of water (known as "hydroentanglement").

The fibers produced in the spunbond process are usually in the range of from about 10 to about 50 microns in diameter, depending on process conditions and the desired end use for the fabrics to be produced from such fibers. For example, increasing the polymer molecular weight or decreasing the processing temperature results in larger diameter fibers. Changes in the quench air temperature and pneumatic draw pressure also have an affect on fiber diameter.

The nonwoven compositions described herein may be a single layer, or may be multilayer laminates. One application is to make a laminate (or "composite") from meltblown ("M") and spunbond ("S") nonwoven compositions, which combines the advantages of strength from the spunbonded component and greater barrier properties of the meltblown component. A typical laminate or composite has three or more layers, a meltblown layer(s) sandwiched between two or more spunbonded layers, or "SMS" nonwoven composites. Examples of other combinations are SSMMSS, SMMS, and SMMSS composites. Composites can also be made of the meltblown or spunbond nonwovens of the invention with other materials, either synthetic or natural, to produce useful articles.

In certain embodiments, the meltblown or spunbond nonwoven compositions of the invention comprise one or more elastic layers comprising a PBE and further comprise one or more facing layers comprising an ICP/PBE blend as described herein positioned on one or both sides of the elastic layer(s). In some embodiments, the elastic layers and the facing layers may be produced in a single integrated process, preferably a continuous process. For example, a spunmelt process line may incorporate meltblown technology such that multilayer nonwoven laminates are produced that contain one or more meltblown elastic layers laminated to one or more other spunbond layers (which may be elastic or inelastic) in a single continuous integrated process.

The nonwoven products described above may be used in many articles such as hygiene products including, but not limited to, diapers, feminine care products, and adult incontinent products. The nonwoven products may also be used in medical products such as sterile wrap, isolation gowns, operating room gowns, surgical gowns, surgical drapes, first aid dressings, and other disposable items.

EXAMPLES

Polymer blends according to the invention comprising an ICP and a PBE, identified as Samples 1-18, were prepared as shown in Table 1. The ICP has an MFR of 35 g/10 min, as determined by ASTM D1238 (230° C., 2.16 kg), and is available commercially from ExxonMobil Chemical Co. as ICP grade PP7035. The PBE has an ethylene content of 15 wt % and an MFR of 18 g/10 min, and is available commercially from ExxonMobil Chemical Co. under the tradename Vistamaxx™ 6202. In addition to the designated ICP and PBE, above, each of Samples 1-18 also included a masterbatch containing erucamide as a slip additive, designated S1428 and available commercially from Polyvel Inc.

TABLE 1

| Sample No. | ICP, Wt % | PBE, Wt % | Masterbatch, Wt % |
|---|---|---|---|
| 1 | 74 | 23 | 3 |
| 2 | 69 | 28 | 3 |
| 3 | 64 | 33 | 3 |
| 4 | 64 | 33 | 3 |
| 5 | 64 | 33 | 3 |
| 6 | 64 | 33 | 3 |
| 7 | 59 | 38 | 3 |
| 8 | 59 | 38 | 3 |
| 9 | 59 | 38 | 3 |
| 10 | 54 | 43 | 3 |
| 11 | 54 | 43 | 3 |
| 12 | 54 | 43 | 3 |
| 13 | 54 | 43 | 3 |
| 14 | 54 | 43 | 3 |
| 15 | 54 | 43 | 3 |
| 16 | 49 | 48 | 3 |
| 17 | 49 | 48 | 3 |
| 18 | 49 | 48 | 3 |

Fibers and spunbond fabrics were then formed from Samples 1-18. The fibers were partially oriented yarn fibers produced on continuous filament spinning equipment. The fabrics were produced on Reicofil 4 spunbond process equipment available from Reifenhauser GmbH and Co. The fabrics were produced at line speeds ranging from 54 to 136 m/min, throughput rates ranging from 173 to 221 kg/hr, die pressures ranging from 37 to 43 bar, die melt temperatures ranging from 216 to 217° C., average calender temperatures ranging from 140 to 145° C., and a nip pressure of 100 N/mm. In addition to Samples 1-18, fibers and fabrics were also formed from two comparative materials, identified as C1 and C2. C1 comprised 100 wt % propylene homopolymer commercially available from ExxonMobil Chemical Co. as PP3155. C2 comprised 100 wt % of the same ICP used in Samples 1-18. Selected properties of the resulting fibers and fabrics are shown in Table 2, below.

has a particular property identified in a claim, then any published or well-recognized method or test procedure can be followed to determine that property, although the specifically identified procedure is preferred. Each claim should be construed to cover the results of any of such procedures, even to the extent different procedures can yield different results or measurements. Thus, a person of ordinary skill in the art is to expect experimental variations in measured properties that are reflected in the claims.

TABLE 2

| | | | | | | | | | Sample No. | | | | | | | | | | |
|---|---|---|---|---|---|---|---|---|---|---|---|---|---|---|---|---|---|---|---|
| | C1 | C2 | 1 | 2 | 3 | 4 | 5 | 6 | 7 | 8 | 9 | 10 | 11 | 12 | 13 | 14 | 15 | 16 | 17 | 18 |
| Fiber Thickness, den | 3.3 | 4.0 | 4.7 | 4.4 | 5.3 | 4.7 | 5.7 | 5.3 | 5.3 | 5.3 | 5.3 | 4.5 | 4.5 | 4.5 | — | — | — | — | 4.5 | — |
| Titer, μm | — | 24.8 | 27.1 | 26.1 | 28.6 | 27.0 | 29.7 | 28.7 | 28.7 | 28.7 | 28.7 | 26.5 | 26.5 | 26.5 | — | — | — | — | 26.5 | — |
| Fabric Weight, gsm | 24.9 | 24.5 | 25.5 | 25.7 | 35.3 | 30.5 | 40.1 | 50.5 | 30.3 | 50.9 | 36.7 | 24.1 | 40.1 | — | 30.3 | 50.9 | 36.7 | 24.1 | 40.1 | — |

The tensile strength and elongation of the spunbond nonwoven fabrics prepared from Samples C1, C2, and 1-18 in both the machine and cross directions were evaluated according to ASTM D882. The results are reported in Table 3, below.

TABLE 3

| Sample No. | Tensile Strength, N/5 cm (MD) | Tensile Strength, N/5 cm (CD) | Elongation, % (MD) | Elongation, % (CD) |
|---|---|---|---|---|
| C1 | 52 | 42 | 78 | 83 |
| C2 | 20 | 17 | 68 | 74 |
| 1 | 17 | 16 | 77 | 92 |
| 2 | 16 | 14 | 73 | 91 |
| 3 | 24 | 19 | 94 | 97 |
| 4 | 20 | 17 | 85 | 102 |
| 5 | 30 | 25 | 111 | 108 |
| 6 | 36 | 34 | 108 | 119 |
| 7 | 18 | 14 | 88 | 86 |
| 8 | 36 | 32 | 110 | 125 |
| 9 | 25 | 22 | 95 | 103 |
| 10 | 12 | 17 | 93 | 104 |
| 11 | 24 | 21 | 96 | 130 |
| 12 | 33 | 26 | 114 | 125 |
| 13 | 25 | 22 | 103 | 118 |
| 14 | 35 | 29 | 113 | 131 |
| 15 | 49 | 38 | 121 | 139 |
| 16 | 24 | 21 | 91 | 116 |
| 17 | 33 | 29 | 106 | 126 |
| 18 | 49 | 39 | 127 | 136 |

As reflected in Table 3, blending an ICP with a PBE results in fabrics having high elongation, particularly in the cross direction, and tensile strength comparable to or better than the comparative fabrics. The fabrics had desirable aesthetic properties including a soft, cloth-like feel. Additionally, improved spinnability of monocomponent fibers was observed for the polymer blends when processed on a spunbond beam.

For purposes of convenience, various specific test procedures are identified above for determining certain properties. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures can yield different results or measurements. Thus, a person of ordinary skill in the art is to expect experimental variations in measured properties that are reflected in the claims.

Having described the various aspects of the compositions herein, further specific embodiments of the invention include those set forth in the following lettered paragraphs:

A. A fiber comprising from about 45 to about 85 wt % of an impact copolymer, where the impact copolymer comprises (preferably as a blend) a propylene homopolymer and a copolymer comprising from about 20 to about 80 wt % propylene-derived units and from about 20 to about 80 wt % ethylene-derived units; and from about 15 to about 55 wt % of a propylene-based elastomer, where the propylene-based elastomer comprises from about 5 to about 25 wt % units derived from one or more $C_2$ or $C_4$-$C_{12}$ alpha-olefins and has a triad tacticity greater than about 90% and a heat of fusion less than about 75 J/g.

B. The fiber of paragraph A, wherein the fiber comprises from about 25 to about 50 wt % of the propylene-based elastomer.

C. The fiber of any of paragraphs A and B, further comprising a slip additive.

D. The fiber of any of paragraphs A through C, wherein the fiber has a thickness from about 4 to about 6 denier.

E. The fiber of any of paragraphs A through D, wherein the impact copolymer has a melt flow rate from about 20 to about 50 g/10 min.

F. The fiber of any of paragraphs A through E, wherein the propylene-based elastomer comprises from about 9 to about 18 wt % ethylene-derived units.

G. The fiber of any of paragraphs A through F, wherein the fiber has a monocomponent structure.

H. A spunbond fabric comprising one or more fibers according to any of paragraphs A through G.

I. A nonwoven composition comprising from about 45 to about 85 wt % of an impact copolymer, where the impact copolymer comprises a blend of a propylene homopolymer and a copolymer comprising from about 20 to about 80 wt % propylene-derived units and from about 20 to about 80 wt % ethylene-derived units; and from about 15 to about 55 wt % of a propylene-based elastomer, where the propylene-based elastomer comprises from about 5 to about 25 wt % units derived from one or more $C_2$ or $C_4$-$C_{12}$ alpha-olefins and has a triad tacticity greater than about 90% and a heat of fusion less than about 75 J/g.

J. The composition of paragraph I, wherein the composition comprises from about 25 to about 50 wt % of the propylene-based elastomer.

K. The composition of any of paragraphs I and J, further comprising from about 1 to about 5 wt % of a masterbatch comprising a slip additive.

L. The composition of any of paragraphs I through K, wherein the composition is spunbond.

M. The composition of any of paragraphs I through L, wherein the impact copolymer has a melt flow rate from about 20 to about 50 g/10 min.

N. The composition of any of paragraphs I through M, wherein the propylene-based elastomer comprises from about 9 to about 18 wt % ethylene-derived units.

O. The composition of any of paragraphs I through N, wherein the composition has a basis weight from about 20 to about 55 g/m$^2$.

P. The composition of any of paragraphs I through O, wherein the composition has a cross direction elongation greater than about 100%.

Q. The composition of any of paragraphs I through P, wherein the composition has a machine direction elongation greater than about 85%.

R. A nonwoven laminate comprising an elastic layer and at least one facing layer, wherein the facing layer comprises fibers according to any of paragraphs A through H.

S. A nonwoven laminate comprising an elastic layer and at least one facing layer, wherein the facing layer comprises a nonwoven composition according to any of paragraphs I through Q.

T. A nonwoven laminate comprising (i) an elastic layer; and (ii) one or more facing layers, wherein the facing layer comprises from about 45 to about 85 wt % of an impact copolymer, where the impact copolymer comprises (preferably as a blend) a propylene homopolymer and a copolymer comprising from about 20 to about 80 wt % propylene-derived units and from about 20 to about 80 wt % ethylene-derived units; and wherein the facing layer further comprises from about 15 to about 55 wt % of a propylene-based elastomer, where the propylene-based elastomer comprises from about 5 to about 25 wt % units derived from one or more $C_2$ or $C_4$-$C_{12}$ alpha-olefins and has a triad tacticity greater than about 90% and a heat of fusion less than about 75 J/g.

U. The nonwoven laminate of paragraph T, wherein the facing layer comprises from about 25 to about 50 wt % of the propylene-based elastomer.

V. The nonwoven laminate of any of paragraphs T and U, wherein the facing layer further comprises from about 1 to about 5 wt % of a masterbatch comprising a slip additive.

W. The nonwoven laminate of any of paragraphs T through V, wherein the facing layer is formed from monocomponent fibers having a thickness from about 4 to about 6 denier.

X. The nonwoven laminate of any of paragraphs T through W, wherein the facing layer is a spunbond nonwoven fabric having a basis weight from about 20 to about 55 g/m$^2$.

Y. The nonwoven laminate of any of paragraphs T through X, wherein the elastic layer comprises a propylene-based elastomer comprising from about 5 to about 25 wt % units derived from one or more $C_2$ or $C_4$-$C_{12}$ alpha-olefins and having a triad tacticity greater than about 90% and a heat of fusion less than about 75 J/g.

Z. The nonwoven laminate of any of paragraphs T through Y, wherein the laminate comprises two facing layers positioned on opposite sides of the elastic layer.

AA. The nonwoven laminate of any of paragraphs T through Z, wherein the elastic layer is meltblown and each facing layer is spunbond.

AB. A process for producing a meltspun, preferably meltblown or spunbond, fiber comprising: (i) forming a polymer blend comprising from about 45 to about 85 wt % of an impact copolymer, where the impact copolymer comprises (preferably as a blend) a propylene homopolymer and a copolymer comprising from about 20 to about 80 wt % propylene-derived units and from about 20 to about 80 wt % ethylene-derived units; and from about 15 to about 55 wt % of a propylene-based elastomer, where the propylene-based elastomer comprises from about 5 to about 25 wt % units derived from one or more $C_2$ or $C_4$-$C_{12}$ alpha-olefins and has a triad tacticity greater than about 90% and a heat of fusion less than about 75 J/g; and (ii) forming fibers comprising the polymer blend.

AC. A process for producing a meltspun, preferably meltblown or spunbond, nonwoven composition comprising: (i) forming a polymer blend comprising from about 45 to about 85 wt % of an impact copolymer, where the impact copolymer comprises (preferably as a blend) a propylene homopolymer and a copolymer comprising from about 20 to about 80 wt % propylene-derived units and from about 20 to about 80 wt % ethylene-derived units; and from about 15 to about 55 wt % of a propylene-based elastomer, where the propylene-based elastomer comprises from about 5 to about 25 wt % units derived from one or more $C_2$ or $C_4$-$C_{12}$ alpha-olefins and has a triad tacticity greater than about 90% and a heat of fusion less than about 75 J/g; (ii) forming fibers comprising the polymer blend; and (iii) forming an nonwoven layer from the fibers.

AD. The process of paragraph AC, wherein the extensible nonwoven layer is a facing layer.

AE. The process of paragraph AD, wherein the process further comprises forming an elastic nonwoven layer and combining the elastic nonwoven layer with the nonwoven facing layer to form a nonwoven laminate.

AF. The process of paragraph AE, wherein the elastic nonwoven layer comprises propylene and from about 5 to about 25 wt % units derived from one or more $C_2$ or $C_4$-$C_{12}$ alpha-olefins and has a triad tacticity greater than about 90% and a heat of fusion less than about 75 J/g.

AG. The process of any of paragraphs AE and AF, wherein the extensible nonwoven facing layer and the elastic nonwoven layer are produced in a single integrated process.

AH. The fiber, composition, laminate, or process of any of paragraphs A-AG, wherein the impact copolymer comprises from about 50 to about 90 wt % of the propylene homopolymer, and from about 5 to about 60 wt % of the copolymer, by weight of the impact copolymer.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

As used herein, the phrases "substantially no," and "substantially free of" are intended to mean that the subject item is not intentionally used or added in any amount, but may be present in very small amounts existing as impurities resulting from environmental or process conditions.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. A fiber consisting of:
   a. from 49 to 74 wt % of an impact copolymer having a melt flow rate of from about 20 to about 50 g/10 min, where the impact copolymer comprises a blend of from about 60 to about 90 wt % of a propylene homopolymer component, free of visbreaking, and from about 10 to about 40 wt % of a copolymer component comprising from about 20 to about 80 wt % propylene-derived units and from about 20 to about 80 wt % ethylene-derived units;
   b. from 23 to 48 wt % of a propylene-based elastomer having a melt flow rate of from about 1 to about 50 g/10 min, where the propylene-based elastomer comprises from about 5 to about 25 wt % units derived from one or more $C_2$ or $C_4$-$C_{12}$ alpha-olefins and has a triad tacticity greater than about 90% and a heat of fusion less than about 75 J/g; and
   c. slip additive, selected from oleamide and erucamide.

2. The fiber of claim 1, wherein the fiber has a thickness from about 4 to about 6 denier.

3. The fiber of claim 1, wherein the fiber has a monocomponent structure.

4. A spunbond fabric comprising one or more fibers according to claim 1.

5. A nonwoven composition consisting of:
   a. from 49 to 74 wt % of an impact copolymer having a melt flow rate of from about 20 to about 50 g/10 min, where the impact copolymer comprises a blend of from about 60 to about 90 wt % of a propylene homopolymer, free of visbreaking, and from about 10 to about 40 wt % of a copolymer comprising from about 20 to about 80 wt % propylene-derived units and from about 20 to about 80 wt % ethylene-derived units;
   b. from about 23 to 48 wt % of a propylene-based elastomer having a melt flow rate of from about 1 to about 50 g/10 min, where the propylene-based elastomer comprises from about 5 to about 25 wt % units derived from one or more $C_2$ or $C_4$-$C_{12}$ alpha-olefins and has a triad tacticity greater than about 90% and a heat of fusion less than about 75 J/g; and
   c. from about 1 to 5 wt % of a masterbatch comprising a slip additive, selected from oleamide and erucamide;
   wherein the nonwoven composition has a basis weight from about 20 to about 55 g/m², a peak elongation in the machine direction of greater than 100%, a peak elongation in the cross direction of greater than 100%, a tensile strength in the machine direction of greater than 10 N/5 cm and a tensile strength in the cross direction of greater than 10 N/5 cm.

6. The composition of claim 5, wherein the composition is spunbond.

7. The composition of claim 5, wherein the composition consists of from 49 to 64 wt % of the impact copolymer and from 33 to 48 wt % of the propylene-based elastomer.

8. A nonwoven laminate comprising:
   a. an elastic layer; and
   b. one or more facing layers, wherein the facing layer consists of:
      i. from 49 to 74 wt % of an impact copolymer having a melt flow rate of from about 20 to about 50 g/10 min, where the impact copolymer comprises a blend of from about 60 to about 90 wt % of a propylene homopolymer, free of visbreaking, and from about 10 to about 40 wt % of a copolymer comprising from about 20 to about 80 wt % propylene-derived units and from about 20 to about 80 wt % ethylene-derived units; and
      ii. from 23 to 48 wt % of a propylene-based elastomer having a melt flow rate of from about 1 to about 50 g/10 min, where the propylene-based elastomer comprises from about 5 to about 25 wt % units derived from one or more $C_2$ or $C_4$-$C_{12}$ alpha-olefins and has a triad tacticity greater than about 90% and a heat of fusion less than about 75 J/g; and
      iii. slip additive, selected from oleamide and erucamide;
      wherein the facing layer has a basis weight from about 20 to about 55 g/m², a peak elongation in the machine direction of greater than 100%, a peak elongation in the cross direction of greater than 100%, a tensile strength in the machine direction of greater than 10 N/5 cm and a tensile strength in the cross direction of greater than 10 N/5 cm.

9. The nonwoven laminate of claim 8, wherein the facing layer is formed from monocomponent fibers having a thickness from about 4 to about 6 denier.

10. The nonwoven laminate of claim 8, wherein the facing layer is a spunbond nonwoven composition.

11. The nonwoven laminate of claim 8, wherein the elastic layer comprises a propylene-based elastomer comprising from about 5 to about 25 wt % units derived from one or more $C_2$ or $C_4$-$C_{12}$ alpha-olefins and having a triad tacticity greater than about 90% and a heat of fusion less than about 75 J/g.

12. The nonwoven laminate of claim 8, wherein the laminate comprises two facing layers positioned on opposite sides of the elastic layer.

13. The nonwoven laminate of claim 12, wherein the elastic layer is meltblown and each facing layer is spunbond.

14. A process for producing a fiber comprising:
   a. forming a polymer blend consisting of
      i. from 49 to 74 wt % of an impact copolymer having a melt flow rate of from about 20 to about 50 g/10 min, where the impact copolymer comprises a blend of from about 60 to about 90 wt % of a propylene homopolymer, free of visbreaking, and from about 10 to about 40 wt % of a copolymer comprising from about 20 to about 80 wt % propylene-derived units and from about 20 to about 80 wt % ethylene-derived units; and
      ii. from 23 to 48 wt % of a propylene-based elastomer having a melt flow rate of from about 1 to about 50 g/10 min, where the propylene-based elastomer comprises from about 5 to about 25 wt % units derived from one or more $C_2$ or $C_4$-$C_{12}$ alpha-olefins and has a triad tacticity greater than about 90% and a heat of fusion less than about 75 J/g; and iii. slip additive, selected from oleamide and erucamide; and b. forming fibers comprising the polymer blend.

15. A process for producing a nonwoven composition comprising:

a. forming a polymer blend consisting of i. from 49 to 74 wt % of an impact copolymer having a melt flow rate of from about 20 to about 50 g/10 min, where the impact copolymer comprises a blend of from about 60 to about 90 wt % of a propylene homopolymer, free of visbreaking, and from about 10 to about 40 wt % of a copolymer comprising from about 20 to about 80 wt % propylene-derived units and from about 20 to about 80 wt % ethylene-derived units; and ii. from 23 to 48 wt % of a propylene-based elastomer having a melt flow rate of from about 1 to about 50 g/10 min, where the propylene-based elastomer comprises from about 5 to about 25 wt % units derived from one or more $C_2$ or $C_4$-$C_{12}$ alpha-olefins and has a triad tacticity greater than about 90% and a heat of fusion less than about 75 J/g; and iii. slip additive, selected from oleamide and erucamide;

b. forming fibers comprising the polymer blend; and c. forming a nonwoven layer from the fibers, wherein the nonwoven layer has a basis weight from about 20 to about 55 g/m², a peak elongation in the machine direction of greater than 100%, a peak elongation in the cross direction of greater than 100%, a tensile strength in the machine direction of greater than 10 N/5 cm and a tensile strength in the cross direction of greater than 10 N/5 cm.

16. The process of claim 15, wherein the nonwoven layer is a facing layer.

17. The process of claim 16, wherein the process further comprises forming an elastic nonwoven layer and combining the elastic nonwoven layer with the nonwoven facing layer to form a nonwoven laminate.

18. The fiber of claim 1, wherein the propylene homopolymer component of the impact copolymer has a molecular weight distribution of less than 4.5, and wherein the copolymer component of the impact copolymer consists essentially of from about 40 to about 60 wt % propylene-derived units and from about 40 to about 60 wt % ethylene-derived units; and wherein the propylene-based elastomer comprises from about 10 to about 25 wt % ethylene-derived units and from about 75 to about 90 wt % propylene-derived units.

* * * * *